United States Patent
Skedinger et al.

(10) Patent No.: US 9,455,841 B2
(45) Date of Patent: Sep. 27, 2016

(54) GROUP HANDLING FOR PUSH-TO-TALK SERVICES

(75) Inventors: Bert Skedinger, Sundbyberg (SE);
Hans Bogeby, Huddinge (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 381 days.

(21) Appl. No.: 13/382,810

(22) PCT Filed: Jul. 10, 2009

(86) PCT No.: PCT/EP2009/058877
§ 371 (c)(1),
(2), (4) Date: Feb. 3, 2012

(87) PCT Pub. No.: WO2011/003477
PCT Pub. Date: Jan. 13, 2011

(65) Prior Publication Data
US 2012/0129516 A1    May 24, 2012

(51) Int. Cl.
*H04W 4/10* (2009.01)
*H04L 12/18* (2006.01)
*H04W 4/08* (2009.01)
*H04W 8/18* (2009.01)
(Continued)

(52) U.S. Cl.
CPC .............. *H04L 12/185* (2013.01); *H04W 4/08* (2013.01); *H04W 8/186* (2013.01); *H04L 12/189* (2013.01); *H04L 12/1822* (2013.01); *H04L 65/4061* (2013.01); *H04W 4/10* (2013.01); *H04W 76/005* (2013.01)

(58) Field of Classification Search
CPC ..................................................... H04W 4/08
See application file for complete search history.

(56) References Cited

U.S. PATENT DOCUMENTS

| 6,963,573 B1 | 11/2005 | Cain et al. |
| 7,864,716 B1 * | 1/2011 | Manroa et al. ............... 370/260 |

(Continued)

FOREIGN PATENT DOCUMENTS

| CN | 1794834 A | 6/2006 |
| CN | 1801970 A | 7/2006 |

(Continued)

OTHER PUBLICATIONS

"Push to Talk over Cellular (PoC); List Management and Do-not-Disturb", PoC Release 1.0, Aug. 2003.*

(Continued)

*Primary Examiner* — John Blanton
(74) *Attorney, Agent, or Firm* — Patent Portfolio Builders, PLLC

(57) ABSTRACT

A method of controlling Group establishment for an IP multimedia communication service facilitated over a communications network, wherein an established Group comprises a set of member Users each of which possesses a User Equipment and, at Group establishment, members' User Equipments are sent an invitation to join the group by a server of said communications network. The method comprises, within said communications network, defining for each of a set of Users of said service, a Group membership policy defining Groups that the User does or does not wish to join. Prior to Group establishment, for each User selected for possible inclusion in the Group, the Group membership policy for that User is used to determine whether or not the User may wish to be included. Invitations are sent only to those users for which it is determined that they may wish to be included in the Group.

18 Claims, 5 Drawing Sheets

(51) Int. Cl.
*H04W 76/00* (2009.01)
*H04L 29/06* (2006.01)

(56) References Cited

U.S. PATENT DOCUMENTS

| | | | |
|---|---|---|---|
| 8,428,634 B2 | 4/2013 | Schwagmann et al. | |
| 2005/0201311 A1* | 9/2005 | Willey et al. | 370/311 |
| 2005/0266869 A1 | 12/2005 | Jung | |
| 2007/0097866 A1 | 5/2007 | Kahtava et al. | |
| 2007/0097886 A1 | 5/2007 | Schwagmann et al. | |
| 2007/0162588 A1 | 7/2007 | Wu et al. | |
| 2007/0184867 A1* | 8/2007 | Son et al. | 455/518 |
| 2007/0189203 A1* | 8/2007 | Sung et al. | 370/328 |
| 2007/0220005 A1* | 9/2007 | Castro Castro et al. | 707/9 |
| 2008/0080479 A1* | 4/2008 | Maes | 370/352 |
| 2009/0094367 A1* | 4/2009 | Song | H04L 12/1818 709/227 |
| 2009/0147705 A1* | 6/2009 | Kowalewski | 370/261 |
| 2010/0234057 A1* | 9/2010 | Drozt et al. | 455/518 |
| 2010/0325289 A1* | 12/2010 | Dostal et al. | 709/227 |

FOREIGN PATENT DOCUMENTS

| | | |
|---|---|---|
| CN | 101098267 A | 1/2008 |
| CN | 100484272 C | 4/2009 |
| WO | WO 2008/003829 A1 | 1/2008 |

OTHER PUBLICATIONS

International Search Report and The Written Opinion Corresponding to International Application No. PCT/EP2009/058877; Date of Mailing: Mar. 18, 2010; 13 pages.

International Preliminary Report on Patentability Corresponding to International Application No. PCT/EP2009/058877; Date of Mailing: Oct. 25, 2011; 6 pages.

Chinese Office Action Corresponding to Chinese Patent Application No. 200980160510.2; Date of Issue: Dec. 4, 2013; English Translation, 12 Pages.

Chinese Office Action Corresponding to Chinese Patent Application No. 200980160510.2; Date of Issue: Sep. 30, 2014; English Translation,23 Pages, Foreign Text, 15 pages.

Comments on Chinese Office Action Corresponding to Chinese Patent Application No. 200980160510.2, Date of Issue: Sep. 30, 2014, English Translation, 6 pages.

PCT Demand Corresponding to International Application No. PCT/EP2009/058877, Dated: Mar. 25, 2011, 5 Pages.

* cited by examiner

GROUP HANDLING FOR PUSH-TO-TALK SERVICES

CROSS REFERENCE TO RELATED APPLICATIONS

This application is a 35 U.S.C. §371 national stage application of PCT International Application No. PCT/EP2009/058877, filed on 10 Jul. 2009. The above-referenced PCT International Application was published in the English language as International Publication No. WO 2011/003477 A1 on 13 Jan. 2011. The disclosure of the above referenced application is hereby incorporated herein in its entirety by reference.

TECHNICAL FIELD

The present invention relates to group handling for Push-To-Talk services and in particular, though not necessarily, to group handling for the Push-to-talk over Cellular service facilitated by the IP Multimedia Subsystem.

BACKGROUND

Walkie-talkie type services have long proved popular amongst users who wish to communicate brief messages quickly between one another. Conventionally, such services have been provided by two-way portable radios which utilise a dedicated part of the radio spectrum, but which only allow users to communicate with a small group of pre-selected users who utilise similar terminals and who are within range of the relatively short operating range of the radios. More recently, so-called Push-To-Talk (PTT) services have been introduced into the United States which piggy-back on the existing cellular telephone infrastructure. However, these PTT services have been proprietary in nature and have not allowed users to communicate between different operator networks.

In an attempt to broaden the use of walkie-talkie type services, an industry grouping known as the Open Mobile Alliance (www.openmobilealliance.org) has been established with the aim of standardising suitable protocols which will allow inter-network operability for Walkie-Talkie services offered over cellular networks. The service established by the various standards is known as Push-to-talk over Cellular (PoC). PoC proposes that associated speech data will be transported over a packet switched access network. In the case of GSM and UMTS, this will be the general packet radio service (GPRS) or 3G access network. In other network architectures, analogous packet switched access networks will be utilised for transporting talk data. Push to Talk services may also be offered over circuit switched access networks, although this is not the preferred option.

The Push to talk over Cellular (PoC) system is typically implemented on GSM/GPRS/3G networks and which makes use of the IP Multimedia Subsystem (IMS) standardised by the $3^{rd}$ Generation Partnership Project to facilitate the introduction of advanced data services into cellular networks, and in particular of real-time multimedia services. The IMS relies upon the Session Initiation Protocol (SIP) which has been defined by the Internet Engineering Task Force (IETF) for the setting up and control of multimedia IP-based sessions. A PoC Server is located within the IMS or is attached thereto, and implements the functionality for setting up and controlling PoC Sessions.

The "Group" is a concept standardised in OMA and provided as a general feature to OMA services including, but not limited to, PoC. Groups can be made applicable to one or more services, or services can be excluded from being used by a Group. A Group can be configured to include a set of pre-defined members, and is specified by an XML "Group Document". The Group document can hold a list of members that specifies membership to the Group. A Group Document can also specify a policy for the Group, i.e. a set of pre-defined rules that indicate what authority is associated with a membership. A group document is maintained by an XML Document Management Server (XDMS). Groups, membership to Groups, and policies for Groups (including sharing of a Group between services) can be configured by management operations supported by the OMA XML Document Management (XDM) enabler.

When creating a new Group it is possible to automatically advertise the existence of the Group to the Group members. It is also possible to advertise to existing members when a newcomer is added to an already existing Group (or a member is removed). This is realised using the standardised feature known as "Extended Group Advertisement", as specified in the OMA XDM 2.0 release, where the Shared Group XDMS that stores the Group document, also creates the advertisement message and sends it towards each member. The feature can be used by any service for which the Group is defined. Whether an automatic advertisement shall be sent or not is configured for the Group. [NB. The term "Shared" when referring to the Group XDMS and also to the Policy XDMS is not used in later OMA releases, but it will be understood that when referring to the Shared Group XDMS and Shared Policy XDMS in this document, those later releases are also encompassed.]

It is also possible for the creator of a PoC Group to advertise the members of the new Group from a user terminal, or "User Equipment", such as a mobile terminal, equipped with a PoC Client using the feature "Group Advertisement", as specified in OMA PoC V1.0 release. Both this advertisement feature and the Group XDMS advertisement feature mentioned above use the PoC Server to route the advertisement message to Group members. The advantage of utilising these features is that members can be made aware of the existence of a group before the group is called into any session or other communication.

As well as pre-defined groups, Group members can also be defined temporarily, i.e. the membership to the group exists only for the duration of the communication session. These are referred to as ad-hoc Groups. For such groups no Group Advertisement can be sent out on beforehand to signal the existence of the group, and no check of membership policy can be done before the group is called into any session. Such temporary groups can for example be created as 1-1 sessions or 1-to-many, e.g. by a PoC User providing a list of peer Users invited to the ad-hoc PoC Group session, as specified in OMA PoC V1.0 release. [In PoC standard specifications members in a PoC session are denominated "Participants".]

One mechanism for creating pre-defined and ad-hoc groups is to use criteria under which membership is valid. These criteria are associated with the information available about each User, e.g. being located in the London area and being 'available' for communication. The set of members matching the criteria may change dynamically depending on User behaviour. In PoC V2.1 release there is a feature for dynamic PoC Groups that use criteria for defining groups. The criteria can be defined ad-hoc by a User who invites other Users or can be pre-defined for a Group, and can be applied to a PoC session either only at session establishment or also during the whole session. These dynamic PoC sessions will then be similar to ordinary PoC sessions, but in this case the Participants in the PoC session will only be those matching the criteria, i.e. Participants can be added or removed dynamically during a session based on the criteria.

The OMA CBUS (Condition Based URIs Selection) enabler provides a signalling interface to other OMA services (e.g. PoC) that enables them, from an input consisting of a set of criteria and a list of Users, to find those Users in the list that match the criteria. This interface is used, e.g. by a PoC server, to find which Users to invite to a PoC session.

Members in a Group can also be defined by means of a search for Users using a set of search criteria. In this case the Group itself is pre-defined but the list of members in the Group document is empty, as specified in Requirement Document for PoC V2.1. The search criteria will then determine which Users that can become members of the Group. This search feature is intended to be supported in a future release of OMA CBUS V1.0, as specified in Requirement Document for CBUS V1.0, extending the CBUS enabler to allow searching for matching Users based on a set of criteria but without having any list of Users to select from.

A User can define and store his or her own access policy, as specified in PoC V1.0 release and in XDM 2.0 release, to define the rules under which incoming calls and messages are accepted by the User. The rules are stored in a Shared Policy XDMS, and are private and not revealed by the system to other Users. In particular, a User can specify whether a peer User is allowed to invite him/her or not, e.g. by assigning the peer User's PoC address to the condition element <identity>, together with an actions element <allow-reject-invite> set to 'true' in his User Access policy document. The document is XML-based and conforms to the common policy framework as specified in IETF RFC4745 [Common Policy: A Document Format for Expressing Privacy Preferences", H. Schulzrinne et al, February 2007]. Being a member of a Group does not mean that the member User has to give up his User Access policy as an individual. Members within a Group may still have their own privacy policy and apply it against the other members of the Group.

The current state of OMA PoC is set out in Release 1.0. The specification for PoC Release 2.0 and PoC release 2.1 is on-going. PoC Release 2.0 will extend PoC to include multimedia and not just speech, while PoC release 2.1 will enhance the PoC session establishment and media type handling. The current state of OMA XDM is set out in Release 1.1. The specification for XDM Release 2.0 and 2.1 is on-going. Both XDM Release 2.0 and 2.1 will extend XDM to include extended features for Group management and support of PoC. The current state of OMA CBUS is set out in Release 1.0 whose specification is ongoing.

The User access policy rules, or indeed any other rule associated with the User, do not allow a User to accept or reject proposed membership of a Group. The existing User access policy document is a limited mechanism as the User can only specify the policy based on inviting identity and not for example on the nature/type of group. Although the identity (e.g. which the User wishes to block) can be a pre-defined Group identity, the User does not know the identity of the Group before it has been created. Even if the User can include the Group identity in a list of rejected Groups once the Group is created, he can still not prevent becoming a member of the Group.

A PoC Group can be configured to include a set of pre-defined members. For such a pre-defined Group the members can invite themselves to, or be invited to, a PoC session for the Group. Who will be invited to a PoC session may depend on an inviting member's choice. In these simple scenarios there is not a privacy problem because the (invited) User can always refrain from inviting himself or can reject an invitation, e.g. if the invited user does not trust the inviting user. There may however be scenarios in which a User would prefer not to be invited, not necessarily because of who is the inviting User, but because of the reason why he is invited (e.g. as a result of a search for users based upon certain criteria).

When creating a Group and sending the advertisement message to the Group members, it may happen that a member is not available to receive the message, e.g. currently not registered. A User can thus become a member of a Group without being aware of it. In any case, even if the member is registered at the moment of advertising a new Group, it is already too late to reject the membership. The User does not have the possibility to give his consent to or reject the membership. This may be perceived as an intrusion that will make the User reluctant to share his User profile information with the network and other Users.

PoC currently provides a User access policy that is enforced for Users at their Participating PoC servers. Such a policy is applied in real time to incoming session invitations. A User may, for example, set a policy to block invitations for which the originating call identity is anonymous.

SUMMARY

According to a first aspect of the present invention there is provided a method of controlling Group establishment for an IP multimedia communication service facilitated over a communications network, wherein an established Group comprises a set of member Users each of which possesses a User Equipment and, at Group establishment, members' User Equipments are sent an invitation to join the group by a server of said communications network. The method comprises, within said communications network, defining for each of a set of Users of said service, a Group membership policy defining Groups that the User does or does not wish to join. Prior to Group establishment, for each User selected for possible inclusion in the Group, the Group membership policy for that User is used to determine whether or not the User may wish to be included. Invitations are sent only to those users for which it is determined that they may wish to be included in the Group.

Embodiment of the invention may allow a User to define a priori rules defining Groups or categories of Groups that the User is either willing or unwilling to join. In particular, the User can control which Groups he or she is willing to join without having to manually consent to or reject each membership offer. User privacy is improved, as the User will not be reached if he does not want to be, but without having to block all incoming messages or invitations.

Embodiments of the invention may also allow the decision to include a User in a Group document to be taken automatically and at the same time as the Group document is created, without having to wait for any real-time response from the User himself. The User does not even have to be registered as long as there is a membership authorisation policy defined for the User. This will make it possible to take a Group into operation more quickly. Moreover, the proposed approach will not generate traffic that will in any case be rejected at the terminating User, saving bandwidth in the network. The already existing Group and User access Policy documents as defined by OMA can be re-used to support the solution.

The communications network may comprises an IP Multimedia Subsystem network and said service is an IP Multimedia Subsystem service. In this case, the Group membership policies may be defined in an XML document. The method comprises maintaining the Group membership policy for a User at a Shared Policy XDMS.

The step of using the Group membership policy for that User to determine whether or not the User may wish to join, may be carried out at a policy enforcement server, the policy enforcement server retrieving Group membership policies for the selected users from one or more Shared Policy XDMSs. The policy enforcement server may be one of a Shared Groups XDMS, a CBUS server, and an application server acting as policy enforcer for a User.

A Group membership policy defines Groups based upon a content of one or more of the following information elements, information elements being associated with a Group to be established: supported-services; list; invite-members; subject; searchable. A Group membership policy may define Groups based upon an identity of the creator, owner, and/or administrator of the Groups.

The IP Multimedia Subsystem service may be a Push-to-talk Over Cellular service or an Instant Messaging service.

According to a second aspect of the present invention there is provided a computer server for use in an IP multimedia communications network to facilitate the provision of a service over the network. The server comprises a database and database manager for maintaining for each of a set of Users of said service, and a Group membership policy defining service Groups that the User does or does not wish to join. The server further comprises a query response unit for reacting to a query received in respect of one of said Users by extracting that User's Group membership policy from said database and returning it to a querying entity. The Group membership policies may be defined in XML documents, and said server is Shared Policy XDMS configured to operate in an IP Multimedia Subsystem network.

According to a third aspect of the present invention there is provided a computer server for use in a communications network to facilitate the provision of a service over the network. The server comprises a receiver for receiving a request to establish a service Group, and a Group membership creator for responding to receipt of said request by retrieving a Group membership policy for the or each User proposed for the Group, and for determining from the or each retrieved Group membership policy whether or not the corresponding User can be invited to join the group. The server may be configured to operate in an IP Multimedia Subsystem network and being one of a Shared Groups XDMS, a CBUS server, and an application server acting as policy enforcer for a User.

DETAILED DESCRIPTION

Figure 1:
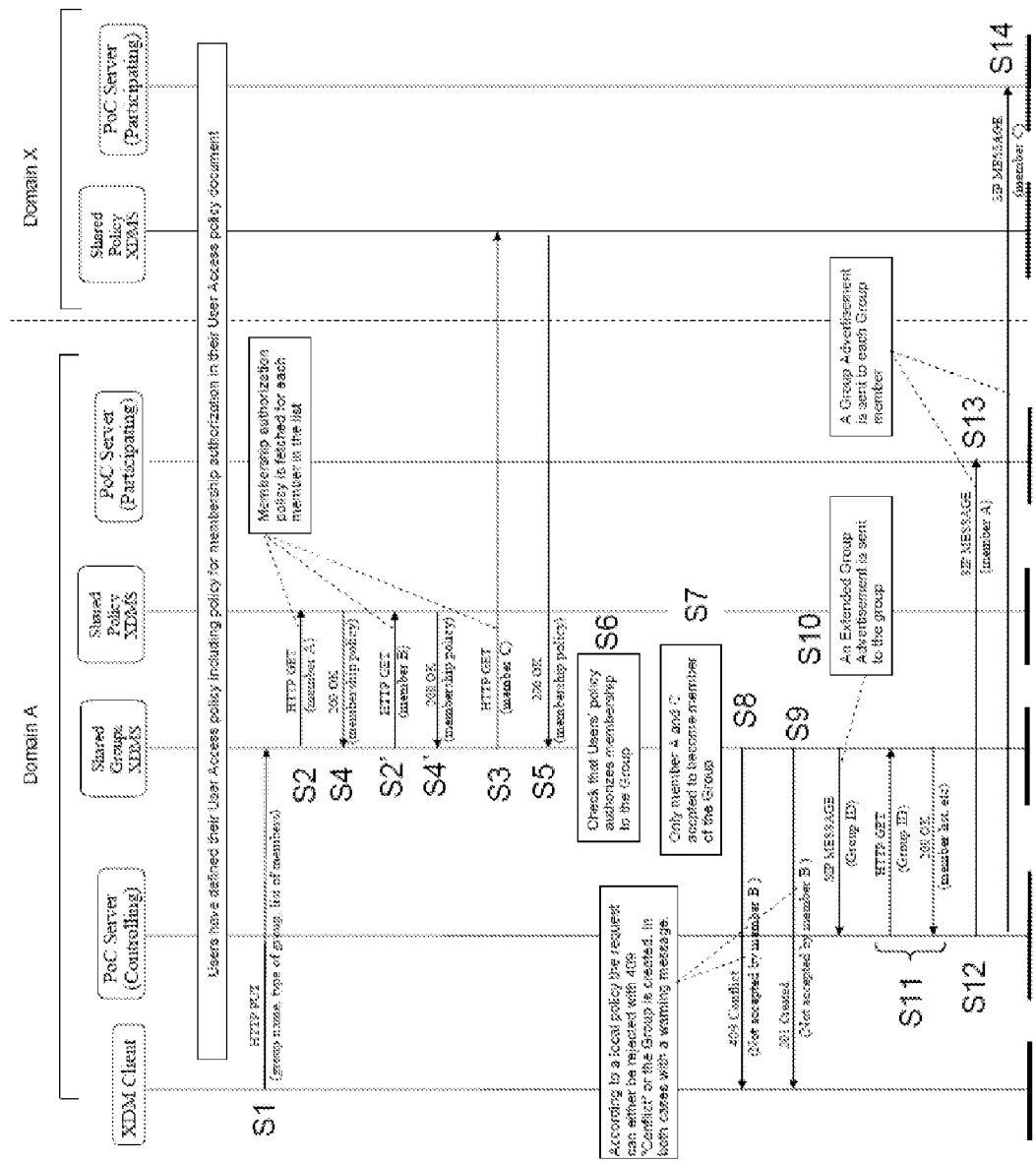
FIG. 1 illustrates a procedure within an IMS network for controlling PoC Group membership according to a first embodiment of the invention.

The problems associated with ensuring user privacy in the context of PoC Groups has been discussed above. A mechanism is needed that allows PoC Users to allow or reject membership of a Group, regardless of whether the Group is permanently or temporarily created. Such a mechanism should prevent Users from being disturbed by unsolicited invitations to join Group sessions, e.g. from an advertising agency. As well as improving user privacy, this approach should reduce network traffic.

It is proposed that a User shall be able to define his or her own rules for rejection and/or opt-in to Group memberships. The Shared Group XDMS or CBUS must check these rules before authorising a creator of a group to include another User as a member of a Group. Considering the proposed approach in more detail, the User involvement is on management level, i.e. the User has to create the rules in a Shared Policy XDMS in the same way as is currently done for a User access policy. The rules can, for example, be defined as conditions and actions elements and specified as an XML schema extension in an XDM enabler.

In the case where a group is established using the Shared Group XDMS server, this server reads the policy information from the Shared Policy XDMS for each member to be added to a Group. This is done in the following cases:

A new Group is created with members in a member list,

One or more members are added to the Group's member list,

In the case of a Group established using the CBUS, the CBUS server reads the policy information from Shared Policy XDMS for each matching member to be added to a Group. This is done in the following case:

On search request to CBUS

The server at the terminating side, e.g. a PoC server that performs the Participating PoC Function and which acts in the same way as the Shared Group XDMS in the sense that it checks membership policies for Users, reads the policy information from the Shared Policy XDMS for each member to be invited to a dynamic PoC Group session (with members assembled either ad-hoc or through search) and for which the server is responsible. This is done in the following cases:

An invitation is received in the server from an inviting User and sent to a User found by a search employing criteria specified for the Group. This applies for example to a PoC session establishment for a pre-arranged PoC Group with pre-defined search criteria and where the member list is empty.

An invitation is received in the server from an inviting User and sent to a User found to match criteria specified by the inviting User. This applies for example when the inviting User (in the case of an ad-hoc PoC Group session invitation request) defines the criteria for participation.

The server at the terminating side, e.g. a PoC server that performs the Participating PoC Function, reads the policy information from the Shared Policy XDMS for each member to be invited to a PoC Group session with members assembled ad-hoc. This is done in the following case:

A number of Users specified ad-hoc by the inviting User are invited to a session.

In the event that a Group membership policy is not yet defined by an invited User, a default policy may be applied.

The default policy can be based for example on a local policy. As a User gains experience, he or she may apply both white lists and black lists to create a membership policy.

A Group with a number of members is created in Shared Group XDMS by an authorised User. The Shared Group XDMS requests, from the Shared Policy XDMS, each member's membership policy. The policy is returned to the Shared Group XDMS by the Shared Policy XDMS. The Shared Group XDMS checks the policy for each member and adds to the Group only those members whose membership policy allows them to be included in the Group. Similarly, a CBUS server requests and receives, from the Shared Policy XDMS, each matching member's membership policy. Of course, actual policy checks may be performed at the Shared Policy XDMS rather than at the Shared Groups XDMS or the CBUS server.

The membership authorisation is based on the common policy framework described in IETF RFC4745, with the extensions defined in PoC and XDM enablers and as set out here.

The membership policy is created by each User, based upon, for example, one or more of the following criteria:

Type of service applicable to the Group.
  For example, XDM enabler or CBUS enabler provides an information element <supported-services> that contains information about the services supported by the Group. The User may want to restrict the membership to Groups where certain services are or are not used.

Identity of the creator/owner/administrator of the Group.
  This information is not stored in the Group document. For example, the XDM enabler or CBUS enabler holds the identity in the User tree stored as a SIP URI or a Tel URI. The User may want to restrict the membership to Groups that are created by or are not created by certain owners.

Identity of Group member.
  For example, the XDM enabler or CBUS enabler provides information element <list> that contains the members of the Group. The User may want to restrict the membership to Groups where certain other Users are members or are not members.

Identity of Group.
  For example, the XDM enabler or CBUS enabler provides information element <list> that can also be used to include nested Groups. The User may want to restrict the membership to Groups where certain other Groups or URI-lists are not included.

Type of Group.
  For example, the XDM enabler or CBUS enabler provides information element <invite-members> that is used to specify if this is a dial-in Group (the User has to invite himself) or a dial-out Group (the User is invited by someone else), e.g. in the PoC standard these groups represent Chat PoC Group and Pre-arranged PoC Group respectively. The User may want to restrict the membership to Groups of a certain type.

Purpose of Group.
  For example, the XDM enabler or CBUS enabler provides information element <subject> that is used to specify a purpose or theme for the Group. The User may want to restrict the membership to Groups of a certain topic or exclude Groups of a certain topic. The user may also want to exclude Groups for which no subject is included or where the element <subject> is empty.

Publicity.
  For example, the XDM enabler or CBUS enabler provides information element <searchable> that is used to specify whether it is possible to search for the Group (using Group Identity). The User may want to restrict the membership to Groups that cannot be found by such a search.

In the case where a CBUS does not support a membership policy check, then for a dynamic PoC Group session, where members are invited based on search, a parameter "dynamic" is introduced, e.g. as a URI parameter added to the Request-URI header in a SIP INVITE request of a PoC Session invitation request sent from the PoC server performing the Controlling PoC Function towards an invited PoC Client. This parameter indicates that the invited User has been found using a search. As the criteria used for a search can be hidden from the invited User, the new parameter allows a User to specify in his membership policy whether such invitations will be accepted or not, regardless of the used search criteria.

A User membership policy can also be based on the type of PoC Session that a PoC user is invited to. The existing URI parameter "session-type" used in a SIP INVITE request (and as specified in OMA PoC release 1.0) can be used for this. Today it is used for invitations sent from a PoC server performing the Controlling PoC Function, but only to indicate Pre-arranged and Chat PoC Group sessions. The absence of the parameter in a SIP INVITE indicates that the session is either a 1-1 or 1-to-many PoC Session. To be able to distinguish between all types of sessions, the parameter should always be included and extended to indicate other types of session, e.g. also a 1-1 or 1-to-many (ad-hoc) type of PoC Session.

By way of example, the following information structure for membership authorization can be used within a membership policy:

Example of Conditions elements
temporary group—used in a policy rule to specify whether inclusion in a Group where membership is temporary is allowed or not. Membership is temporary if the Group members are defined only for the initiated session, e.g. being defined ad-hoc or defined by a dynamic PoC Group or added to such a Group. The element can include a list of one or more session types or the sub-element "all sessions except".
all sessions except—used as a sub-element of the element "temporary group" in a policy rule to specify session types that are excluded from the rule.
group by subject—used in a policy rule to specify subjects of a Group. The element can include a list of one or more subjects or the sub-element "all subjects except".
all subjects except—used as a sub-element of element "group by subject" in a policy rule to specify subjects of a Group that are excluded from the rule.

Example of Actions elements
Allow membership ("true"/"false")—used to specify whether membership is allowed or not.

Based on these extensions, examples of membership policy rules are as follows (based upon IETF RFC4745):

Example 1

According to the rule "dyn123", membership is authorized to all Pre-arranged PoC Groups created by a search.

```
<rule id="dyn123">
    <conditions>
        <temporary-group>
            <group = "prearranged"/>
        <temporary-group>
        <service-list>
            <service enabler = "poc"/>
        </service-list>
    </conditions>
    <actions>
        <allow-membership>true</allow-membership>
    </actions>
</rule>
```

Example 2

According to the rule "sub456", membership is authorised to those groups created with topic text "golf" or text starting with the character string "sail", or if owner/creator/administrator of the group is a User with the public user identity "bob@example.com". In the example a wildcard ("*") is used to indicate that any character string starting with "sail" applies to the rule.

```
<rule id="sub456">
    <conditions>
        <group-by-subject>
            <subject = "golf"/>
            <subject = "sail*"/>
        </group-by-subject>
        <identity>
            <one id = "sip:bob@example.com"/>
        </identity>
    </conditions>
    <actions>
        <allow-membership>true</allow-membership>
    </actions>
</rule>
```

Example 3

According to the rule "other789", membership is not authorized to groups other than those groups created with topic text "golf" or text starting with the character string "sail" or to any other creator/owner/administrator of a group than the User with the public user identity "alice@example.com".

```
<rule id="other789">
    <conditions>
        <group-by-subject>
            <all-subjects-except>
                <subject = "sail*"/>
                <subject = "golf"/>
            </all-subjects-except>
        </group-by-subject>
        <identity>
            <many>
                <except id = "sip:alice@example.com"/>
            </many>
        </identity>
    </conditions>
    <actions>
        <allow-membership>false</allow-membership>
    </actions>
</rule>
```

It is of course important to allow for backward compatibility when introducing any new service. In a mixed network, where there are User handsets or terminals that do not support the membership authorisation functionality but the PoC Server performing the Participating PoC Function and the Shared Policy XDMS do support the functionality, a local policy in the XDMS can indicate a default membership policy for the legacy Users. The default policy can then be applied to these Users by the PoC Server. For example, the policy can allow for the receiving of invitations to dynamic pre-arranged PoC Group sessions created by a search, by treating these as ordinary pre-arranged PoC Group sessions, i.e. the User will perceive it as an ordinary session.

In a mixed network where there are Users with handsets or terminals that do not support the membership authorisation functionality but the Shared Group XDMS/CBUS and Shared Policy XDMS do support this functionality, a local policy in the Shared Group XDMS/CBUS can be set to indicate whether a User creating a Group is allowed to include another User in the Group or whether any such attempt shall be rejected when that other User does not support the membership authorisation functionality, i.e. when the other user is unable to give consent to or to reject the attempt. In order to be backward compatible, the default should be to allow the User to be included in the Group.

In a mixed network where there are Users with handsets or terminals that support the membership authorization functionality but the PoC servers or Shared Group XDMS or Shared Policy XDMS do not support the functionality, the legacy Users will perceive the function as unavailable.

FIG. 1 illustrates an example procedure employing the Group membership authorisation mechanism at creation of a Pre-arranged Group. The Users invited in this example have already defined their User Access policies, including their membership authorisation policies, in the Shared Policy XDMS. The Users either belong to a Service Provider of domain A or X. The access to the Shared XDMS servers through an Aggregation Proxy (AP) as specified in the XDM 2.0 enabler is not shown in the Figure. The routing through the originating PoC server is also omitted in the Figure.

The steps shown in FIG. 1 are as follows:

S1. The XDM Client A initiates creation of a Pre-arranged PoC Group by sending an XCAP PUT request to the Shared Group XDMS according to procedures defined by OMA. The request includes an XML document containing, for example, the type of Group (dial-out), a list of potential members A, B and C of the Group, and an indication that a Group Advertisement message shall be sent to the members.

S2,S2'. The Shared Group XDMS fetches the User Access Policy document for each member in the list of Group members from the Shared Policy XDMS in domain A, according to the procedures defined in OMA. The action is repeated for all members of domain A until the document has been fetched for all members.

S3. The Shared Group XDMS fetches the User Access Policy document for each member in the list of Group members from the Shared Policy XDMS in domain X, according to the procedures defined in OMA. The action is repeated for all members of domain X until the document has been fetched for all members.

S4,S4'. The Shared Policy XDMS in domain A returns the User Access Policy document in a 200 OK response for each member of domain A.

S5. The Shared Policy XDMS in domain X returns the User Access Policy document in a 200 OK response for each member of domain X.

S6. The Shared Group XDMS checks if the member authorises to become a member of this Group according to his/her membership authorization policy defined in the User Access Policy document. The Shared Group XDMS compares the authorisation policy with information available in the Group document. The action is repeated for each User in the list of potential members.

S7. The Shared Group XDMS determines that members A and C authorise to become members of this Group, while member B does not authorize to become member of this Group.

S8. The Shared Group XDMS can, for example according to a local policy (or Service Provider policy), either reject the creation request with a 409 Conflict response including detailed information that member B was not included as a member of this Group, or accept the request and return a 201 Created response including detailed information that member B was not included as a member of this Group. If rejected, the procedure does not continue; otherwise the procedure continues at step S9.

S9. The Shared Group XDMS accepts the request and returns a 201 Created response including detailed information that member B does not authorize to become a member of this Group.

S10. The Shared Group XDMS sends an Extended Group Advertisement in a SIP MESSAGE request to the PoC Server performing the Controlling PoC Function that owns this Group, according to the procedures defined by OMA.

S11. The PoC Server performing the Controlling PoC Function fetches the Group document from the Shared Group XDMS, according to procedures defined by OMA. The list of Group members is included in the Group document. The list contains members A and C, but not B.

S12. The PoC Server performing the Controlling PoC Function forwards the Group Advertisement SIP MESSAGE request to each of member A and member C, according to procedures defined by OMA.

S13. The PoC Server in domain A performing the Participating PoC Function receives the Group Advertisement request for member A and forwards the request to the PoC Client of member A, according to procedures defined by OMA (not shown in the figure).

S14. The PoC Server in domain X performing the Participating PoC Function receives the Group Advertisement request for member C and forwards the request to the PoC Client of member C, according to procedures defined by OMA (not shown in the figure).

Figure 2:
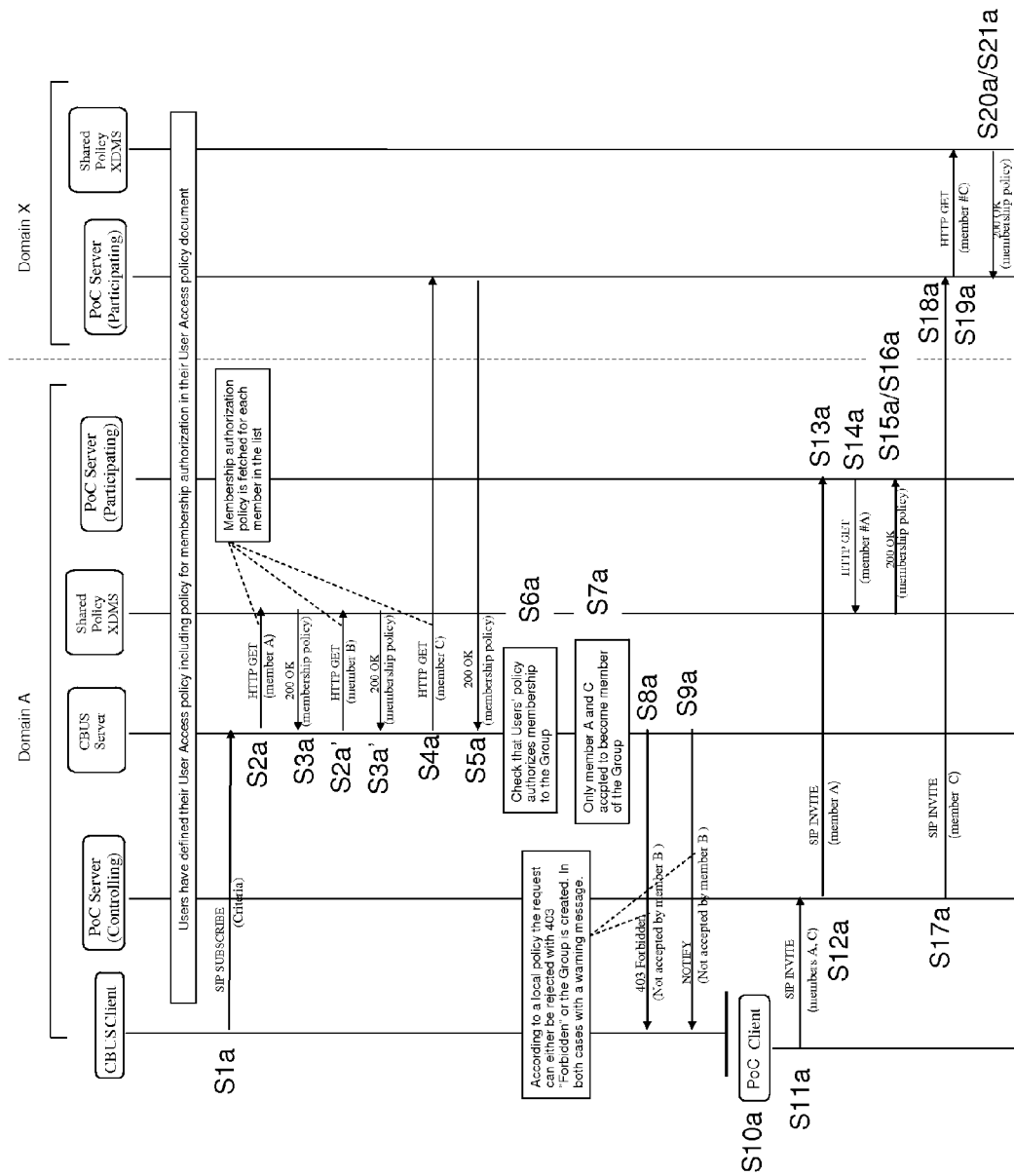
FIG. 2 illustrates a procedure within an IMS network for controlling PoC Group membership according to a second embodiment of the invention.

FIG. 2 illustrates how the Group membership authorization mechanism can be used when the CBUS receives a request to establish a Group based upon received criteria. The Users identified by the CBUS as matching the criteria will in this example have already defined their User Access policies including their membership authorization policy in the Shared Policy XDMS. The Users belong either to a Service Provider of domain A or X. The access to the Shared XDMS servers through AP as specified in the XDM 2.0 enabler is not shown in the Figure. The routing through the originating PoC server is also omitted in the Figure. The skilled person will be aware of various different approaches for allowing the CBUS server to find matching Users.

The steps shown in FIG. 2 are as follows:

S1a. The CBUS Client A initiates a SIP SUBSCRIBE request to the CBUS Server according to the procedures defined by OMA. The request includes a list with potential members A, B and C of the Group.

S2a,S2$_a$'. The CBUS Server fetches the User Access Policy document for each matching member from the Shared Policy XDMS in domain A, according to procedures defined in OMA. The action is repeated for all matching members of domain A until the document has been fetched for all members.

S3a,S3a'. The Shared Policy XDMS in domain A returns the User Access Policy document in a 200 OK response for each member of domain A.

S4a. The CBUS Server fetches the User Access Policy document for each matching member from the Shared Policy XDMS in domain X, according to the procedures defined in OMA. The action is repeated for all members of domain X until the document has been fetched for all members.

S5a. The Shared Policy XDMS in domain X returns the User Access Policy document in a 200 OK response for each member of domain X.

S6a. The CBUS Server checks if the member authorizes to become a member of this Group according to his membership authorization policy defined in the User Access Policy document. The action is repeated for each member in the list of Users in the search result list.

S7a. The CBUS Server determines that members A and C authorize to become members of this Group, while member B does not authorize to become a member.

S8a. The CBUS Client receives a list of Users that match the search criteria for the Group in domain A and domain X, i.e. member A and C in a SIP NOTIFY request from the CBUS Server including a detailed information that member B was not included as a member of this Group. The CBUS Client keeps the Users in a list for members that match the search criteria for the group.

S9a. NOTE. The CBUS Server can alternatively, for example according to a local policy or Service Provider policy, reject the creation request with a SIP 403 "Forbidden" response including detailed information that member B did not accept to become a member of this Group. If rejected, the procedure does not continue; otherwise the procedure continues with the rest of the steps.

S10a. The User decides to invite members to an Ad-hoc Group Session based on the received list of matching members.

S11a. The PoC Client sends a SIP INVITE request for an Ad-hoc Group Session to the PoC server performing the Controlling PoC Function with a list of Users that match the search criteria for the Group.

S12a. For each User that matches the search criteria and belongs to domain A, the PoC server performing the Controlling PoC Function sends a PoC Session invitation request to the User in a SIP INVITE request. The PoC server includes an indication that this is a temporary group. The action is repeated for each User belonging to domain A in the list.

S13a. The PoC server performing the Participating PoC Function for the User in domain A receives the SIP INVITE request and detects that this is a temporary group.

S14a. The PoC server performing the Participating PoC Function for a User in domain A requests the membership authorization policy for the User from the Shared Policy XDMS according to procedures defined in OMA. The action is repeated for each User belonging to domain A in the list.

S15a. The PoC server receives an XCAP 200 OK response from Shared Policy XDMS with a User Access Policy document for the User including his membership authorization policy. The action is repeated for each User belonging to domain A in the list.

S16a. The PoC server Participating PoC Function detects that the User A authorizes to become a member of this temporary group. The PoC server sends a SIP INVITE request to the PoC Client of member A (not shown in the Figure). The PoC Client accepts the request and a SIP 200 OK response is returned towards the PoC server performing the Controlling PoC Function (not shown in the Figure).

S17a. For each User that matches the search criteria and belongs to domain X, the PoC server performing the Controlling PoC Function sends a PoC Session invitation request to the User in a SIP INVITE request. The PoC server includes an indication that this is a temporary group. The action is repeated for each User belonging to domain X in the list.

S18a. The PoC server performing the Participating PoC Function for a User in domain X receives the SIP INVITE request and detects that this is a temporary group. The action is repeated for each User belonging to domain X in the list.

S19a. The PoC server performing the Participating PoC Function for a User in domain X requests the membership authorization policy for the User from the Shared Policy XDMS according to the procedures defined in OMA. The action is repeated for each User belonging to domain X in the list.

S20a. The PoC server receives an XCAP 200 OK response from Shared Policy XDMS with a User Access Policy document for the User including his membership authorization policy. The action is repeated for each User belonging to domain X in the list.

S21a. The PoC server Participating PoC Function detects that the User C does not authorize to become a member of this temporary group. The PoC server rejects the received SIP INVITE request with a SIP 403 "Forbidden" response (not shown in the Figure).

Figure 3:
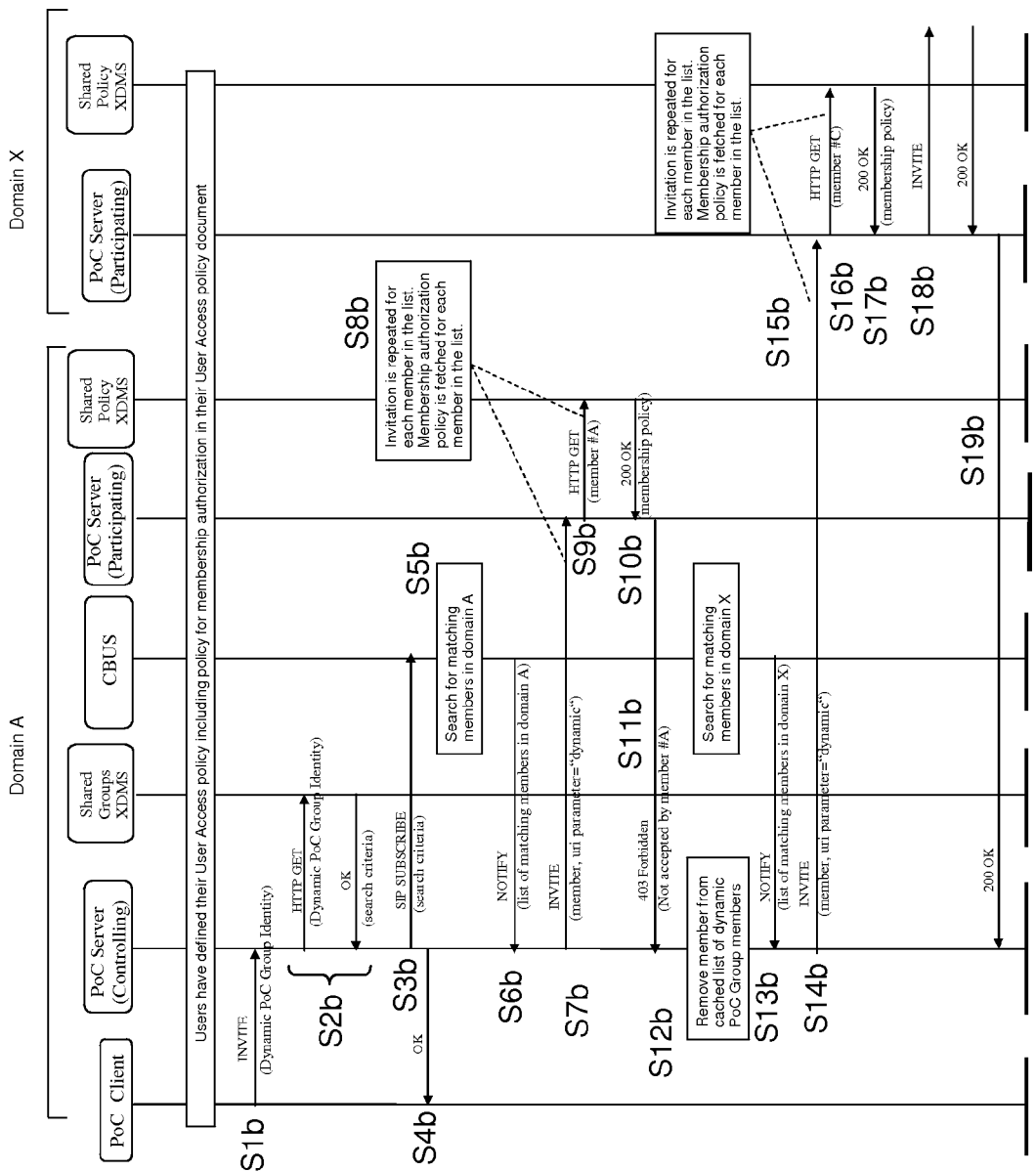
FIG. 3 illustrates a procedure within an IMS network for controlling PoC Group membership according to a third embodiment of the invention.

FIG. 3 illustrates how the Group membership authorization mechanism can be used at creation of a temporary Group. In this example, a PoC Client seeks to establish a Pre-arranged PoC Group session where a search is used to find members matching the pre-defined criteria for participation in the session. The Users invited in this example have already defined their User Access policies including their membership authorization policy in the Shared Policy XDMS. The Users either belong to a Service Provider of domain A or X. The access to Shared XDMS servers through AP as specified in XDM 2.0 enabler is not shown in the Figure. The routing through the originating PoC server is also omitted in the Figure.

The steps shown in FIG. 3 are as follows:

S1b. The PoC Client initiates a Pre-arranged PoC Group Session by sending a SIP INVITE request to the PoC Server according to the procedures defined by OMA.

S2b. The Pre-arranged PoC Group document is fetched by the PoC Server from the Shared Group XDMS.

S3b. The PoC Server detects that the Group does not contain any members but only a set of search criteria and that there is a need to perform a search for members. The PoC Server includes the search criteria and sends a SIP SUBSCRIBE request to the CBUS server.

S4b. The PoC server returns a SIP 200 OK response to the PoC Client indicating that the request has been accepted.

S5b. The CBUS server performs a search for members using some appropriate search strategy.

S6b. The PoC server receives a list of Users that match the search criteria for the Group in domain A in a SIP NOTIFY request from the CBUS server. The PoC server builds and maintains a member list.

S7b. For each User that matches the search criteria and belongs to domain A, the PoC server sends a PoC Session invitation request to the User in a SIP INVITE request. The PoC server includes an indication that this is a temporary group and the type of group. The action is repeated for each User belonging to domain A in the list.

S8b. The PoC server performing the Participating PoC Function for the User in domain A receives the SIP INVITE request and detects that this is a temporary group.

S9b. The PoC server performing the Participating PoC Function for a User in domain A requests the membership authorization policy for the User from the Shared Policy XDMS according to procedures defined in OMA. The action is repeated for each User belonging to domain A in the list.

S10b. The PoC server receives an XCAP 200 OK response from Shared Policy XDMS with a User Access Policy document for the User including his membership authorization policy. The action is repeated for each User belonging to domain A in the list.

S11b. The PoC server detects that the member A does not authorize to become a member of this temporary group. The PoC server rejects the request and returns a SIP 403 Forbidden response to the PoC server performing the Controlling PoC Function. The response includes a reason indicating that User A does not authorize to become a member of this group.

S12b. The PoC server performing the Controlling PoC Function removes User A from the member list for the rest of the existence of this temporary group.

S13b. The PoC server receives a list of Users that match the search criteria for the Group in domain X in a SIP NOTIFY request received from the CBUS server. The PoC server caches the Users in the list for members that match the search criteria for the group.

S14b. For each User that matches the search criteria and belongs to domain X, the PoC server sends a PoC Session invitation request to the member in a SIP INVITE request. The PoC server includes an indication that this is a temporary group and the type of temporary group.

S15b. The PoC server performing the Participating PoC Function for a User in domain X receives the SIP INVITE request and detects that this is a temporary group. The action is repeated for each User belonging to domain X in the list.

S16b. The PoC server performing the Participating PoC Function for a User in domain X requests the membership authorization policy for the User from the Shared Policy XDMS according to procedures defined in OMA. The action is repeated for each User belonging to domain X in the list.

S17b. The PoC server receives an XCAP 200 OK response from the Shared Policy XDMS with a User Access Policy document for the User including his membership authorization policy. The action is repeated for each User belonging to domain X in the list.

S18b. The PoC server detects that the User X authorizes to become a member of this temporary group. The PoC server sends a PoC Session invitation request in a SIP INVITE request to the PoC Client of member X.

S19b. The PoC Client accepts the request and a SIP 200 OK response is returned towards the PoC server performing the Controlling PoC Function.

Figure 4:
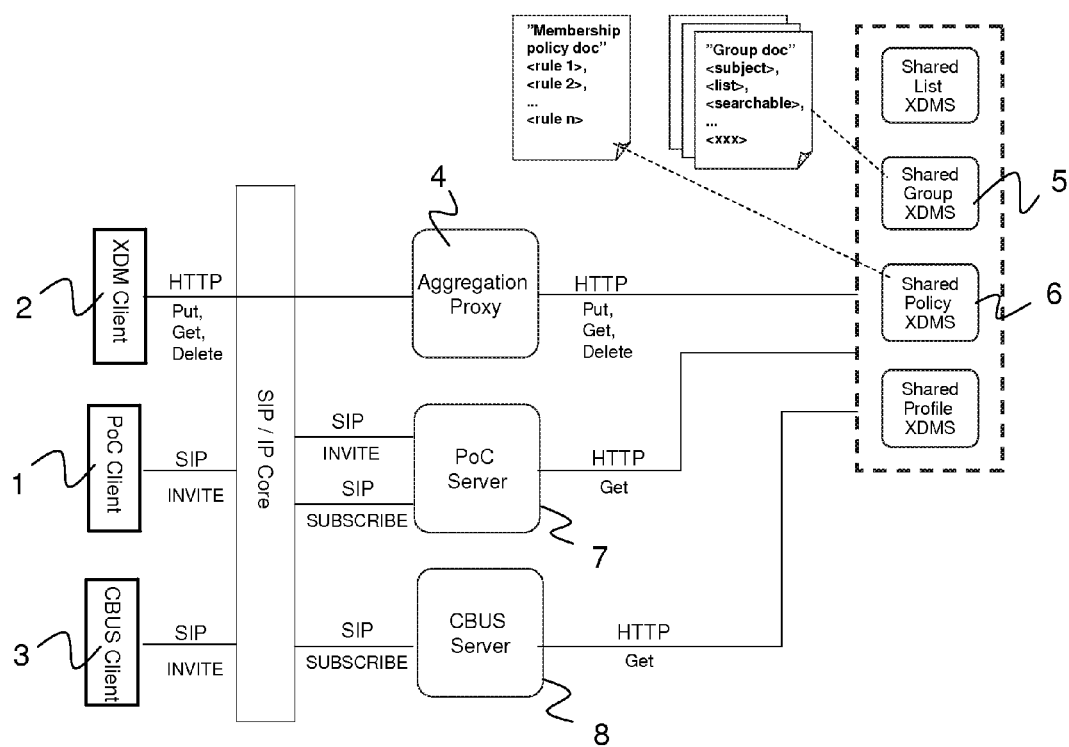
FIG. 4 illustrates schematically various components of an IMS network involved in the procedures of FIGS. 1 to 3.

FIG. 4 illustrates schematically the various entities that may be involved in the procedures described above. These entities may be functional and integrated with other functional entities or may be implemented as standalone nodes.

A PoC Client 1 is implemented at a client terminal (UE) and is responsible for establishing and controlling PoC sessions.

An XDM Client 2 is implemented at a client terminal (UE) and can be used to configure the rules of the membership policy, for example in a User's User Access Policy document as specified in the OMA XDM enabler. The XDM Client is also used to configure the Group document as specified in the OMA XDM enabler.

A CBUS Client 3 performs a request for Users matching the criteria for a Dynamic PoC Group. The CBUS Client can either include a list of Users together with the criteria, or refer to a Group with pre-defined criteria for the Dynamic PoC Group stored in the Shared Groups XDMS.

An Aggregation Proxy 4 is used to route the HTTP requests for the membership policy document to the appropriate XDMS as specified in the OMA XDM enabler.

The Group XDMS 5 stores the Group documents as specified in the OMA XDM enabler.

The Policy XDMS 6 stores the User Access Policy documents as specified in the OMA XDM enabler.

The PoC server performing the Controlling PoC Function 7 is involved in providing information about the specific type of temporary Group for which a PoC Session invitation request is sent.

The PoC server performing the Participating PoC Function at the terminating side (not shown in the Figure) performs an HTTP request to fetch the membership policy document for the served User and based on the rules specified in the membership policy document either rejects or accepts the invitation on behalf of the served PoC User.

The CBUS server 8 performs a search for members of a Dynamic PoC Group based on the criteria for a Pre-arranged PoC Group with pre-defined criteria but an empty list of members. The server also finds matching Users when receiving a request with criteria together with a list of Users. The server performs an HTTP request to fetch the membership policy document for the Users matching the criteria and, based on the rules specified in the membership policy document, either includes or excludes the Users in the result.

Figure 5:
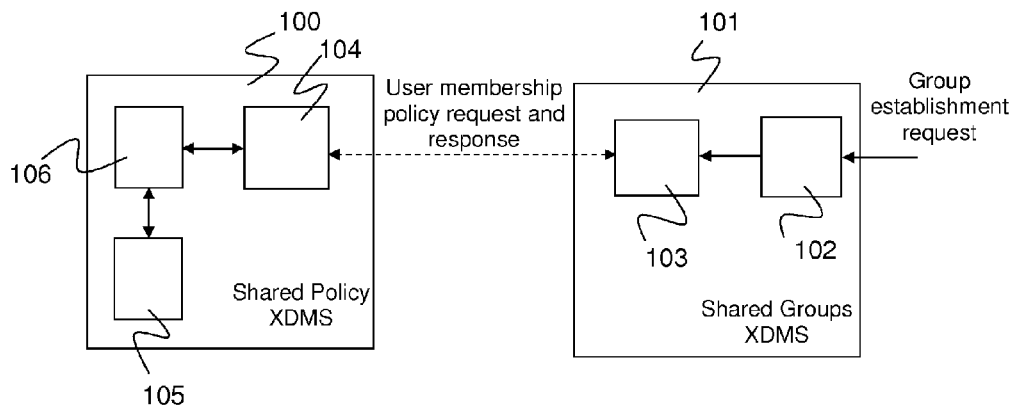
FIG. 5 illustrates schematically a Shared Policy XDMS and a Shared Groups XDMS of the network of FIG. 4.

FIG. 5 illustrates schematically functional components of computer servers configured to implement the Shared Policy XDMS 100 and the Shared Groups XDMS 101 insofar as they relate to User policy management. The Shared Groups XDMS comprises a receiver 102 for receiving a PoC Group establishment request, e.g. from an XDM client. The receiver passes the request to a Group membership creator 103 which retrieves, for each candidate member of the Group, a User Group membership policy. A request for the policy is received at the Shared Policy XDMS by a query response unit 104. The role of this unit is to query a User Group membership policy database 105 via a database manager 106. As well as routing such queries, a role of the database manager is to provide an interface via which Users and network operators can maintain and manage User policies. The Group membership creator 103 of the Shared Groups XDMS will analyse the policies provided to it and establish a Group membership list (if indeed any such members can be identified). A response (not shown) is returned to the appropriate entity, e.g. the XDM client.

Figure 6:
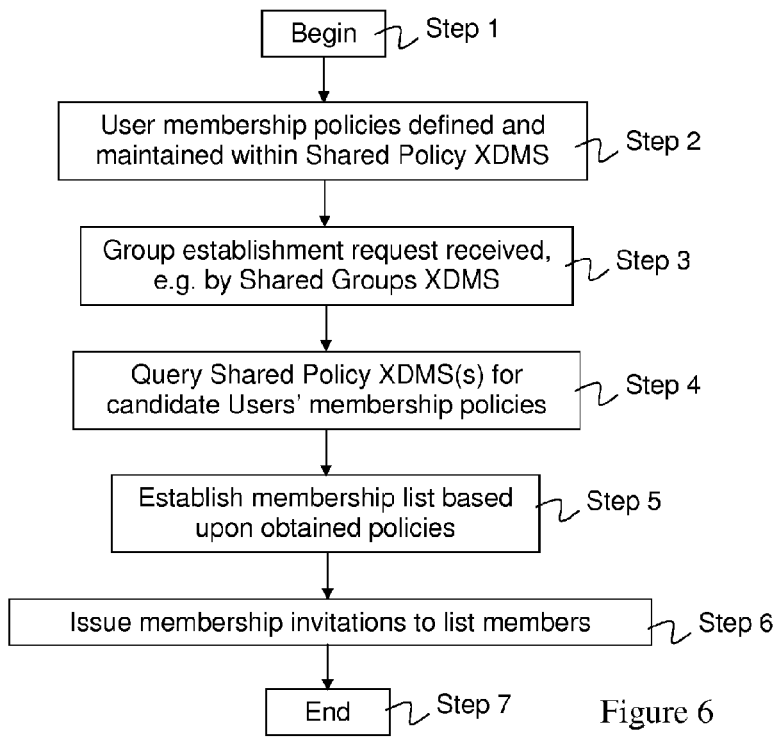
FIG. 6 is a flow diagram illustrating a generic procedure for controlling PoC Group membership.

FIG. 6 is a flow diagram further illustrating the overall procedure for controlling Group membership. The procedure begins at step 1, with user membership policies being defined (and maintained) at step 2, within the Shared Policy XDMS. At step 3, a Group establishment request is received, for example by the Shared Groups XDMS. The request may contain a list of candidate members. At step 4, for each of the candidate members, a query is made to the Shared Policy XDMS to obtain the membership policy. At step 5, a membership list is determined based upon the candidate list and the obtained membership policies. At step 6, invitations are issued to the Users within the membership list. The procedure ends at step 7.

It will be appreciated by the person of skill in the art that various modifications may be made to the above described embodiments without departing from the scope of the present invention. In particular, the skilled person will appreciate that the invention is applicable to IMS services other than PoC and which make use of User Groups, for example IMS Instant Messaging service. Indeed, the invention is applicable to IP multimedia services other services that rely on the IMS.

The invention claimed is:

1. A method of controlling Group establishment for an IP multimedia communication service facilitated over a communications network, wherein an established Group comprises a set of member Users each of which possesses a User Equipment and, at Group establishment, members' User Equipments are sent a group advertisement request to join the Group by a server of said communications network, the method comprising:
    within said communications network, defining for each of a set of Users of said service, a Group membership policy defining Groups for which the User allows or rejects proposed membership;
    prior to Group establishment, receiving a list of Users selected for proposed Group membership, wherein the list of Users selected for proposed Group membership contains a parameter which indicates that a User of the list of Users has been found using a search;
    prior to Group establishment, for each User selected for possible inclusion in the Group, using the Group membership policy for that User to determine whether the User allows or rejects proposed membership in the Group; and
    prior to Group establishment, selectively sending group advertisement requests only to those Users selected for possible inclusion for which it is determined that they have allowed proposed membership in the Group based on using the Group membership policy for each of the Users to determine whether each of the Users allows or rejects proposed membership in the Group.

2. A method according to claim h wherein said communications network comprises an IP Multimedia Subsystem network and said service is an IP Multimedia Subsystem service.

3. A method according to claim 2, wherein the Group membership policies are defined in an XML document.

4. A method according to claim 3 further comprising:
    maintaining the Group membership policy for a User at a Shared Policy XDMS.

5. A method according to claim 4, wherein using the Group membership policy for that User to determine whether the User allows or rejects proposed membership in the Group is carried out at a policy enforcement server, the policy enforcement server retrieving Group membership policies for the selected Users from one or more Shared Policy XDMSs.

6. A method according to claim 5, the policy enforcement server being one of a Shared Groups XDMS, a CBUS server, and an application server acting as policy enforcer for a User.

7. A method according to claim 2, a Group membership policy defining Groups based upon a content of one or more of the following information elements, information elements being associated with a Group to be established:

supported-services;
list;
invite-members;
subject; and
searchable.

8. A method according to claim 2, a Group membership policy defining Groups based upon an identity of the creator, owner, and/or administrator of the Groups.

9. A method according to claim 2, wherein said IP Multimedia Subsystem service is a Push-to-talk Over Cellular service.

10. A method according to claim 1,
wherein defining includes defining a first Group membership policy for a first User defining Groups for which the first User allows or rejects proposed membership and defining a second Group membership policy for a second User defining Groups for which the second User allows or rejects proposed membership,
wherein the first and second Users are selected for possible inclusion in the Group,
wherein using includes using the first Group membership policy for the first User to determine that the first User allows proposed membership in the Group and using the second Group membership policy for the second User to determine that the second User rejects proposed membership in the Group, and
wherein sending includes sending a group advertisement request to the first User responsive to determining that the first user allows proposed membership in the Group based on the first Group membership policy and not sending a group advertisement request to the second User responsive to determining that the second User rejects proposed membership in the Group based on the second Group membership policy.

11. A method according to claim 10 further comprising:
receiving an acceptance from the first User, wherein the acceptance corresponds to the group advertisement request sent to the first User.

12. A method according to claim 11, wherein sending the group advertisement request to the first User comprises sending the group advertisement request to the first User in a SIP message request.

13. A method according to claim 11 further comprising:
responsive to receiving the acceptance from the first User, establishing a Group for IP multimedia communication service including the first User as a member.

14. A method according to claim 13, wherein establishing the Group comprises establishing the Group before any session or other communication involving the Group.

15. A method according to claim 13, wherein the IP multimedia communication service is a Push to talk over Cellular (PoC) communication service.

16. A method according to claim 1 further comprising:
responsive to receiving an acceptance from at least one of the Users, establishing a Group for IP multimedia communication service.

17. A method according to claim 16, wherein establishing the Group comprises establishing the Group before any session or other communication involving the Group.

18. A method according to claim 16, wherein the IP multimedia communication service is a Push to talk over Cellular (PoC) communication service.

* * * * *